(12) United States Patent
Iverson et al.

(10) Patent No.: US 7,578,527 B2
(45) Date of Patent: Aug. 25, 2009

(54) VEHICLE MUD FLAP WITH FENDER FOLD CLAMP

(75) Inventors: David Iverson, Chicago, IL (US); David F. MacNeil, 2435 Wisconsin St., Downers Grove, IL (US) 60515

(73) Assignee: David F. MacNeil, Hinsdale, IL (US)

( * ) Notice: Subject to any disclaimer, the term of this patent is extended or adjusted under 35 U.S.C. 154(b) by 311 days.

(21) Appl. No.: 11/534,242

(22) Filed: Sep. 22, 2006

(65) Prior Publication Data

US 2006/0284407 A1    Dec. 21, 2006

(51) Int. Cl.
    *B62D 25/18* (2006.01)
(52) U.S. Cl. .................. 280/851; 280/848; 280/154; 280/159
(58) Field of Classification Search .......... 280/851, 280/850, 853, 854, 154, 159, 160, 848; 411/112, 411/166, 167, 172
    See application file for complete search history.

(56) References Cited

U.S. PATENT DOCUMENTS

| | | | |
|---|---|---|---|
| 1,513,167 A | 10/1924 | Fleming | |
| 1,809,711 A | 6/1931 | Kile | |
| 2,826,428 A | 3/1958 | Lincoln | |
| 3,953,053 A | 4/1976 | Arenhold | |
| 4,174,850 A * | 11/1979 | Hart | 280/848 |
| 4,264,083 A * | 4/1981 | Matthew et al. | 280/851 |
| 4,268,052 A * | 5/1981 | Sullivan | 280/848 |
| 4,293,140 A * | 10/1981 | Bell et al. | 280/851 |
| 4,323,262 A | 4/1982 | Arenhold | |
| 4,408,939 A * | 10/1983 | Graff et al. | 411/112 |
| 4,524,986 A * | 6/1985 | Ward | 280/851 |
| 4,605,238 A | 8/1986 | Arenhold | |
| 4,621,824 A * | 11/1986 | Arenhold | 280/851 |
| 4,688,814 A | 8/1987 | Arenhold | |
| 4,733,879 A | 3/1988 | Arenhold | |
| 4,927,177 A * | 5/1990 | Price | 280/851 |
| 5,048,868 A | 9/1991 | Arenhold | |

(Continued)

FOREIGN PATENT DOCUMENTS

DE    3532985 A1    3/1987

(Continued)

OTHER PUBLICATIONS

British Patent Office, Combined Search and Examination Report of GB Application No. GB0718453.4, dated Jan. 23, 2008.

(Continued)

*Primary Examiner*—Hau V Phan
(74) *Attorney, Agent, or Firm*—Momkus McCluskey, LLC; Jefferson Perkins

(57) ABSTRACT

The drilling of new holes into a vehicle fender fold is avoided by providing a mud flap with a rotating clamping member. A clamping arm of the rotating clamping member is rotated from a disengaged position to an engaged position behind the fender fold, and is then drawn forwardly on the threads of an attachment bolt to clamp the fender fold between the rotating clamping member and a stationary clamping member in-molded into the mud flap. A visual indicator may be provided to show whether the rotating clamping member is behind the vehicle fender fold to which the mud flap is to be attached.

10 Claims, 6 Drawing Sheets

U.S. PATENT DOCUMENTS

| | | | |
|---|---|---|---|
| 5,486,079 A * | 1/1996 | Martin et al. | 280/851 |
| 6,186,527 B1 * | 2/2001 | Monhollen et al. | 280/154 |
| 6,431,605 B1 | 8/2002 | Miller et al. | |
| 6,648,373 B2 | 11/2003 | Hawes | |
| 6,919,501 B2 | 7/2005 | Burton | |
| 6,971,828 B2 | 12/2005 | Bernardo | |
| 6,974,175 B2 | 12/2005 | Willey | |

FOREIGN PATENT DOCUMENTS

| | | |
|---|---|---|
| DE | 4415648 C1 | 7/1995 |
| FR | 2410591 A | 8/1979 |
| GB | 928004 A | 6/1963 |
| GB | 2045706 A1 | 11/1980 |
| GB | 2114946 A1 | 9/1983 |
| GB | 2223723 A1 | 4/1990 |
| GB | 2327401 A1 | 1/1999 |
| JP | 4244488 A1 | 9/1992 |

OTHER PUBLICATIONS

Search Report, The Patent Office, Application No. GB 9711746.9, Nov. 16, 1998.

U.S. Appl. No. 11/555,601, David Iverson, Vehicle Mud Flap With Sliding Fender Fold Clamp, filed Nov. 1, 2006.

U.S. Appl. No. 11/534,242, David Iverson, Vehicle Mud Flap With Fender Fold Clamp, filed Sep. 22, 2006.

* cited by examiner

VEHICLE MUD FLAP WITH FENDER FOLD CLAMP

BACKGROUND OF THE INVENTION

Conventional motor vehicles have tires partly recessed in wheel wells. Of course the tire extends below, and often far below, the bottom body panel of the vehicle. As it rotates on a surface each wheel (particularly if it is a drive wheel) will have a tendency to kick up tar, water, mud, stones and debris onto the vehicle body panel or rearwardly into the path of traffic behind the vehicle.

To mitigate this problem, mud flaps have been devised which attach to the rear of each wheel well and which extend downward toward the road surface, intercepting much of the matter spinning off of the wheel. Many of these mud flaps have been designed for the automotive aftermarket, in which a vehicle owner will attach the mud flap to the wheel well himself or herself. Prior automotive mud flaps have required further holes to be drilled into the flange called a "fender fold" or lip, which is an extension of the vehicle body panel that skirts the wheel well and which commonly is fabricated of sheet steel. While the use of through-fasteners through such holes usually will assure firm affixation of the mud flap to the vehicle, drilling the holes creates a serious corrosion problem and may void the OEM corrosion warranty.

Prior attempts to affix mud flaps to vehicles without drilling such holes have been less than satisfactory. As can be imagined, a mud flap dropping off of a vehicle at Interstate highway speeds creates a serious safety issue. A need therefore persists for methods and fasteners for firmly affixing mud flaps to vehicle wheel wells without creating a corrosion problem.

SUMMARY OF THE INVENTION

According to one aspect of the invention, a fastener is provided which can securely affix a mud flap or other object to a fender fold or other purchase point on a vehicle. The fastener includes a central bolt or screw, on which is threadedly carried a rotating clamping member. A clamping arm of the rotating clamping member extends radially outwardly from an axis of the bolt or screw. The bolt or screw is inserted through a central hole in a stationary member that also has at least a clamping arm that extends radially outwardly from the screw axis.

To affix the object to the vehicle, the object (such as a mud flap) is positioned adjacent the vehicle purchase point or projection (such as a fender fold). In this position the clamping arm of the stationary fastener is disposed forwardly of the purchase point. The screw is rotated in a predetermined direction to swing the clamping arm of the rotating clamping member from a disengaged position to a second position behind the vehicle purchase point. The rotating clamping member then hits a stop which prevents its rotation with the screw as a unit. Further rotation of the screw causes the rotating clamping arm to be drawn on the threads of the screw toward the stationary clamping member, securely clamping the object to the vehicle purchase point.

In one embodiment, the fastener is incorporated into the body of the object to be affixed, such as a mud flap. In one embodiment the stationary clamping member may be in-molded into the polymer body of the mud flap. The stop of the fastener may be an integral projection of the mud flap body. Further, a rest for the stop arm of the rotating clamping member may likewise be integrally molded into the mud flap body to project from its rear surface so as to prevent the rotating clamping arm from prematurely advancing forwardly on the threads of the central bolt or screw.

In another aspect of the invention, a mud flap is provided, on its forward, consumer-accessible surface, with a visual indicator to indicate whether the fastener is in a disengaged position, or in a second position which is conducive to affixing the mud flap to the vehicle. One form of this visual indicator is an arcuate slot from the forward surface of the mud flap to a rear surface thereof. A finger of the fastener is received into this arcuate slot and is movable from a first end of the slot, indicative of an unengaged fastener position, to a second end of the slot, indicative of the fastener being in the second position. Preferably the indicator finger is formed as an extension of the rotating clamping member, and tells the end user whether the clamping arm thereof has swung behind the fender fold. This assures the end user that tightening the central bolt will cause the clamping arm to clamp the mud flap to the fender fold, rather than just clamping only to the mud flap by itself. Given that a mud flap is a relatively large object which should be firmly affixed to a vehicle such that it won't come off of the vehicle at high speeds, this visual indicator is also a safety measure to assure that the mud flap is properly affixed to the vehicle wheel well.

The present invention thus provides a secure method of affixing a mud flap, or like object, to a vehicle without drilling further holes, and without requiring the end user to manipulate a fastener component on the relatively inaccessible, rearward side of the fender fold or back side of an object to be attached

BRIEF DESCRIPTION OF THE DRAWINGS

Further aspects of the invention and their advantages can be discerned in the following detailed description, in which like characters denote like parts and in which.

DETAILED DESCRIPTION

Figure 1:
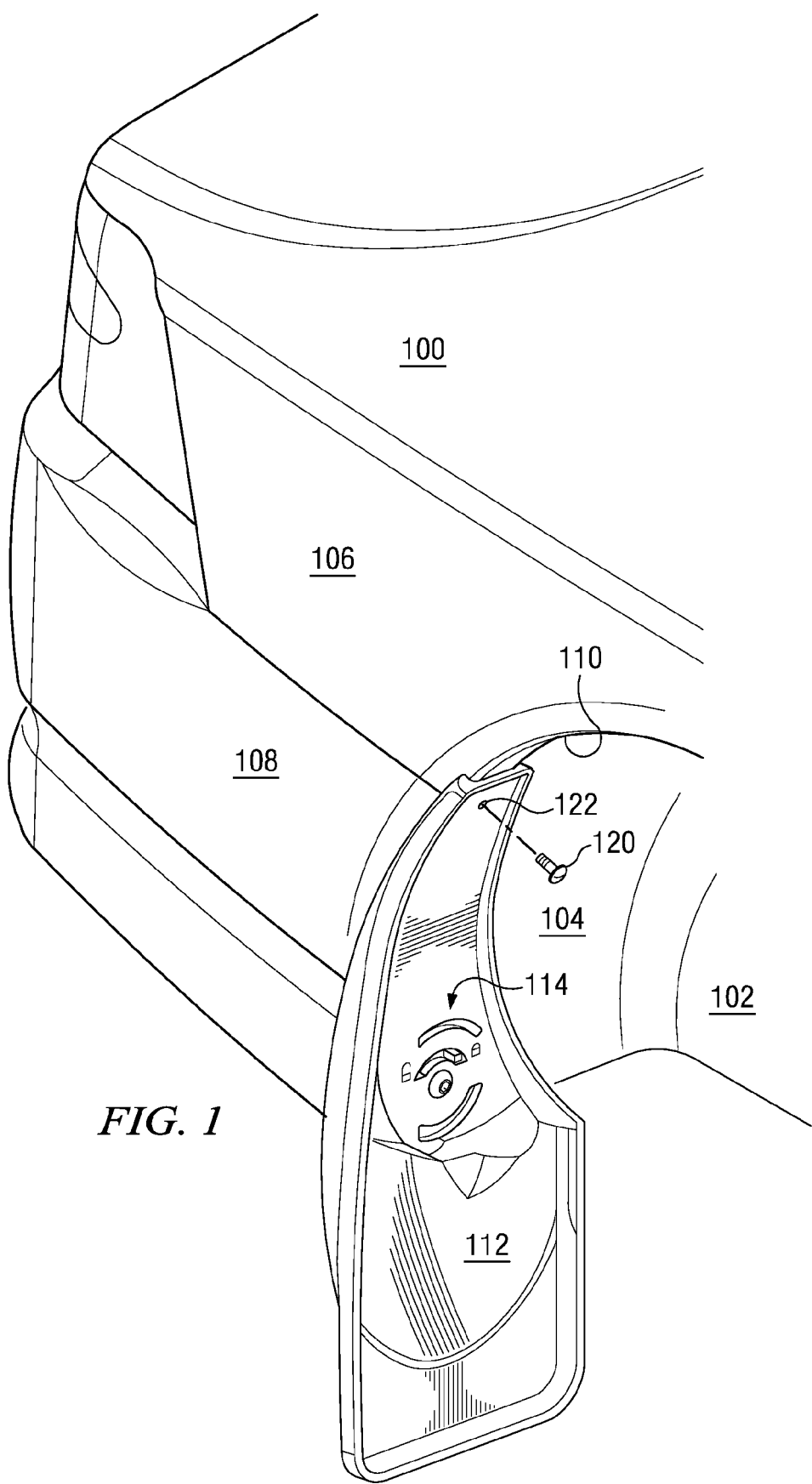
FIG. 1 is an isometric view of a mud flap according to the invention, shown installed on a rear vehicle wheel well.

FIG. 1 shows a conventional vehicle 100 with a wheel well 102. The wheel well 102 typically has a rear curved surface 104 that conforms approximately to a cylinder. The body 106 of the vehicle 100 is typically formed of one or more panels 108 of sheet steel which have been coated with an anticorrosion coating and painted; in certain vehicle models this sheet steel is replaced with another sheet material, such as plastic, aluminum or a fibrous composite. One or more such panels 108 are disposed to be adjacent the wheel well 102. At the juncture of the wheel well 102 and the panel 108, commonly the panel 108 is bent or folded in an inboard direction to make a fender fold or lip 110. This fender fold 110 follows curved surface 104 around at least a large portion of the wheel well 102.

A mud flap 112 according to the invention is affixed to a rearward portion of the curved surface 104, and is particularly placed such that an edge or portion of the mud flap 112 adjoins and is forward of the fender fold 110. The present invention uses the fender fold 110 as an anchor or gripping structure or purchase point to which the mud flap 112 may be securely fastened without drilling further holes in the fender fold 110. A consumer affixes the mud flap 112 to the fender fold 110 at least in part by means of a novel fastener 114, which will be described in more detail below. The fastener 114 is so constructed that the consumer may conveniently, yet securely, install the mud flap 112 without getting underneath the vehicle, and without, in at least some circumstances, obtaining physical access to the rear side of the fender fold 110.

One or more fasteners 114 may be used by themselves to secure the mud flap 112 to the vehicle. In the illustrated exemplary embodiment, a conventional fastener 120 (such as a sheet metal screw, push fastener or nut and bolt) is inserted through a hole 122 which lines up with a pre-drilled, stamped or otherwise formed hole (not shown) in the fender fold 110. For example, an OEM (original equipment manufacturer) fastener may be removed from this existing hole, the mud flap 112 superimposed over it such that the hole 122 is aligned with the OEM's existing hole, and a new (or even the same) fastener 120 may be used to affix the mud flap 112 to the fender fold 110 at this point.

Figure 2:
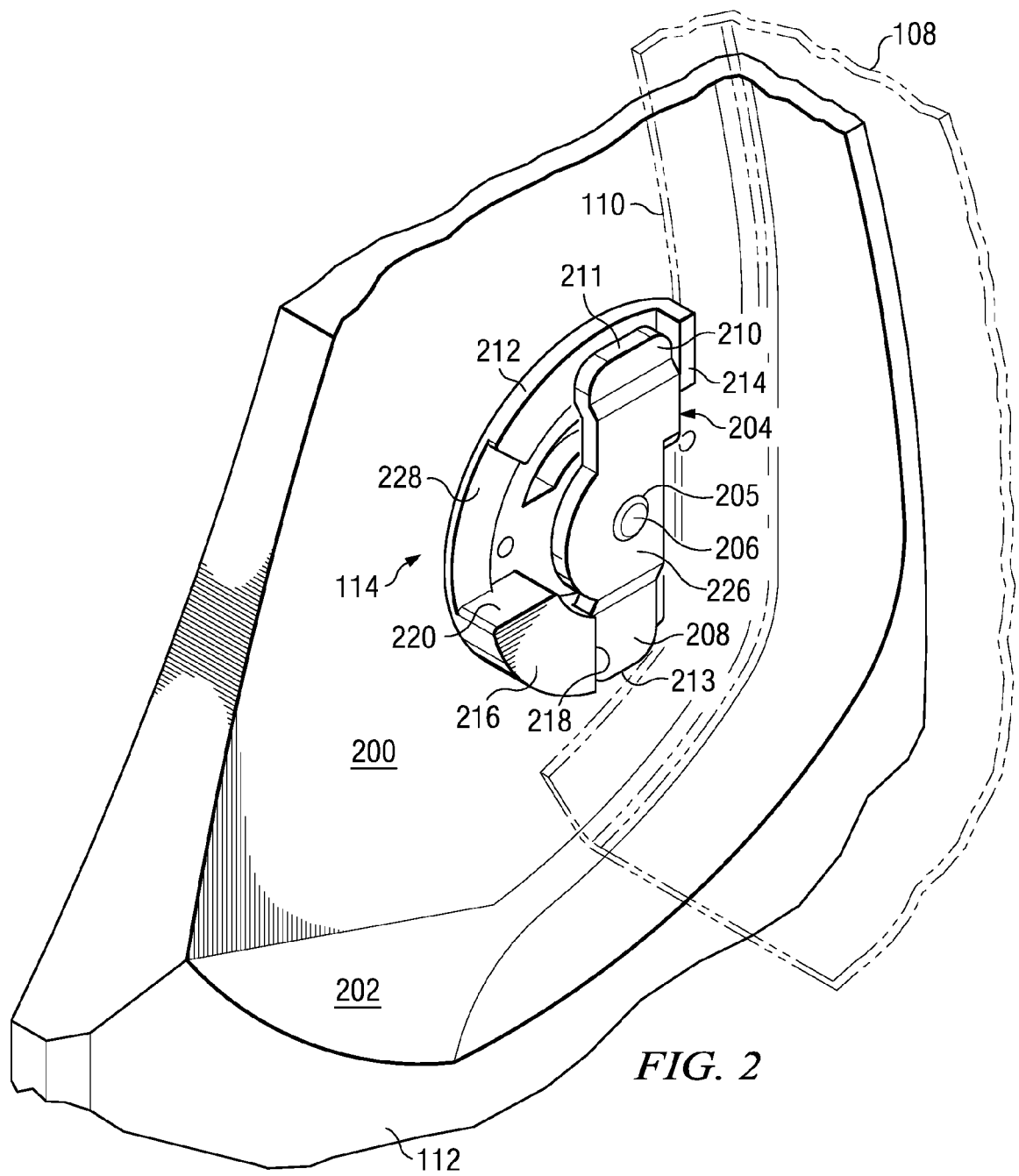
FIG. 2 is a detail of the mud flap shown in FIG. 1, taken from a rearward and inboard direction, showing a rotating member of the mud flap fastener according to the invention in a first, disengaged position.
Figure 3:
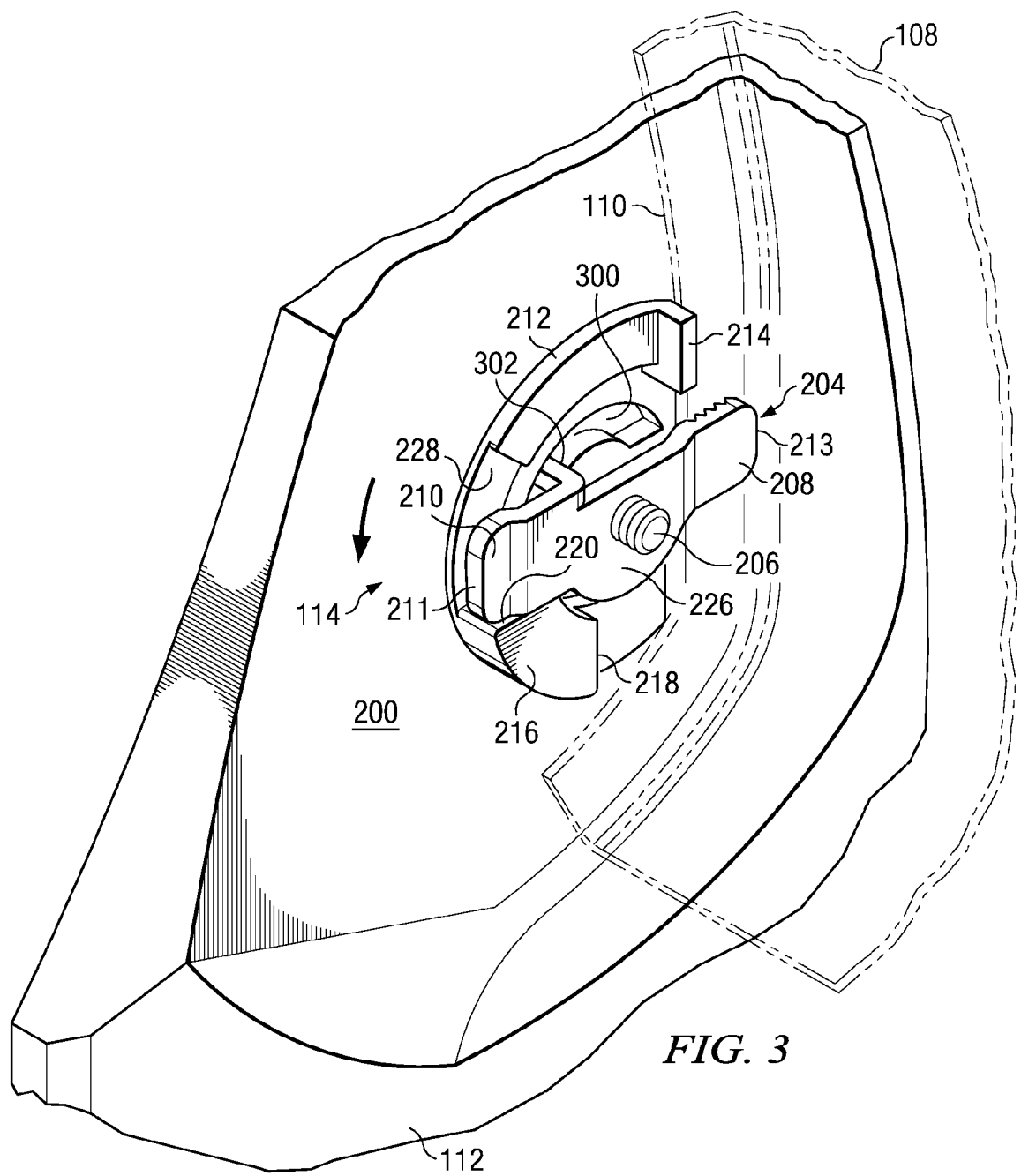
FIG. 3 is a view similar to that shown in FIG. 2, but after the rotating member has been rotated to a second, engaged position.

FIGS. 2 and 3 show a mud flap 112 in the process of being installed in a wheel well of a vehicle. The view of these FIGUREs is from a rearward and inboard direction. The body panel 108, and the panel-terminating fender fold 110 which typically is an integral part of panel 108, are shown in phantom in FIGS. 2 and 3. In the illustrated embodiment, at the location where fastener 114 engages it, the fender fold 110 will stand substantially vertically and in a plane transverse to the direction of travel of the vehicle. But the fastener 114 of the present invention may be used to clamp the mud flap 112 to other locations along the fender fold 110, such as a location higher up on the wheel well 102, and more than one fastener 114 may be used to secure a single mud flap 112. Preferably, a rear surface or face 200 of the mud flap 112 has an indentation 202 formed in it, so as to fit to both the rear surface 104 of the wheel well 102, as well as to an external surface of the body panel 108 as it continues rearwardly from the wheel well 102 (rightward in FIGS. 2 and 3). This allows for a perfectly matched fit of mud flap to fender.

FIG. 2 shows a rotating member 204 of the fastener 114 having a threaded center hole 205 threaded onto a central bolt or screw 206. The bolt 206 is rotatable by a consumer or installer from the opposed, front surface of the mud flap 112 and extends through a nonthreaded bolt hole in the mud flap 112. The rotating member 204 has a clamping arm 208 which radially extends from the axis of bolt 206, and, angularly separated from it, a stop arm 210 which also radially extends from the axis of bolt 206. Preferably the stop arm 210 and the clamping arm 208 are angularly separated by about 180 degrees. The stop arm 210 has a frontwardly offset stop end 211. The clamping arm 208 similarly has a frontwardly offset clamping end 213.

The rear surface 200 of the mud flap 112 has a preferably arcuate shelf or rest 212 which protrudes rearwardly from the general plane of the rear surface 200 by a height which is typically chosen to be greater than the thickness of the fender fold 110. For ease in manufacture, the rest 212 can be molded as indentation of an otherwise generally flat and generally uniformly thick mud flap 112. The rest 212 is positioned to be underneath (forward of) the stop end 211 through a predetermined arc of travel of the stop arm 210. This arc is preferably chosen to extend from a first unengaged position of the stop arm 210 (shown in FIG. 2) to a position at which the stop end 211 will be disposed when the clamping end 213 begins to slide behind the fender fold 110. The purpose of the rest 212 is to prevent frontward movement of the rotating clamping member 204 relative to the bolt 206 and the fender fold 110 until the clamping arm has begun to slide behind the fender fold 110. At a first end of the shelf 212 is a rearwardly projecting lug 214 which acts as a stop to prohibit (in this FIGURE) clockwise rotation of the stop arm 210 and also acts as an abutment surface against which the fender fold 110 can be fitted.

Another rearward projection from the general planar rear surface 200 of the mud flap 112 is a stop 216. Like shelf or rest 212, stop 216 can be molded as an indentation into a region of the mud flap 112 that otherwise has a substantially uniform thickness. The stop 216 may be formed as an arc around the axis of bolt 206, but in any event has two angularly spaced, rearwardly projecting surfaces that are parallel to the axis of bolt 206: a clamping end stop surface 218 against which the clamping end 213 will abut while the rotating clamping member 204 is in the first position, as shown in FIG. 2, and a stop end stop surface 220 against which the stop end 211 will abut while the rotating clamping member is in a second position, as shown in FIG. 3. The surfaces 218 and 220 are deep enough that they will intersect the arcs of travel of the respective clamping and stop ends 213, 211.

The (in FIG. 2) left end of the rest 212 and the stop surface 220 are preferably spaced apart by a shallow arcuate shelf 228 which is typically chosen to be about as thick as the thickness of the fender fold 110. This shelf 228 receives stop arm 210 when the rotating clamping member 204 is completely behind the fender fold 110, as is seen in FIG. 3.

In an alternative embodiment (not shown), the shallow shelf 228 is omitted, leaving a surface which is substantially coplanar with the general real mud flap surface 200. Such an open region could be provided in order to account for variations in the thickness of fender fold 110 and in any attached primer, filler and paint, which can vary from one specific vehicle to the next, even within the same vehicle model. Permitting the stop end 211 to slip frontwardly of the rest 212 allows the opposed clamping end 213 to tilt rearwardly, better assuring that the clamping end 213 will slide behind the fender fold 110 as intended.

Also as seen in FIG. 3, an arcuate slot 300 is formed through the mud flap 112 to be concentric of the bolt 206. A finger 302 of the rotating clamping member 204 is bent or otherwise formed to extend frontwardly (in this FIGURE, to the right) in a direction substantially parallel to the bolt or screw axis. The arcuate slot 300 is sized to receive this finger 302. The finger 302 will be visible from the front side of the mud flap 112 and indicates the position of the rotating member 204 relative to the fender fold 110, as will be explained in more detail below.

As provided to the consumer, the rotating member 204 should take the position shown in FIG. 2 and should not rotate freely and independently of the bolt 206. There needs to be some resistance to the threaded rotation of the member 204 on bolt 206. This can be provided, for example, by coating the end of the threads on bolt 206, or distorting the thread pattern on the end of the bolt to make threaded rotation of the member 204 relative to bolt 206 more difficult, or by distorting the female threads in the central hole 205 formed in the rotating member 204. This resistance to threaded or helical movement permits the clamping end 213 of the rotating member 204 to slide behind the fender fold, in a position that is most rearward on the bolt 206. Otherwise, there is an enhanced danger that the rotating clamping member 204 will start being drawn forwardly on threaded bolt 206 even before its clamping end has slid behind the fender fold 110.

The presence of a bolt-receiving hole 205 in the middle of the rotating clamping member 204 creates a structural weakness at this point; if uncompensated for, any tendency of the rotating member 204 to bow or flex when clamped to the fender fold 110 will occur preferentially in a plane including the bolt hole axis. To compensate for this weakness because of the loss of material, it is preferred to form the rotating clamping member 204 to have a central section 226 which is wider than the stop or clamping arms 208, 210 which extend to either side of it. The central enlarged portion 226 can conveniently take an arcuate shape as shown. Its lateral extent should be chosen so as not to occlude the arcuate slot 300.

Figure 4A:
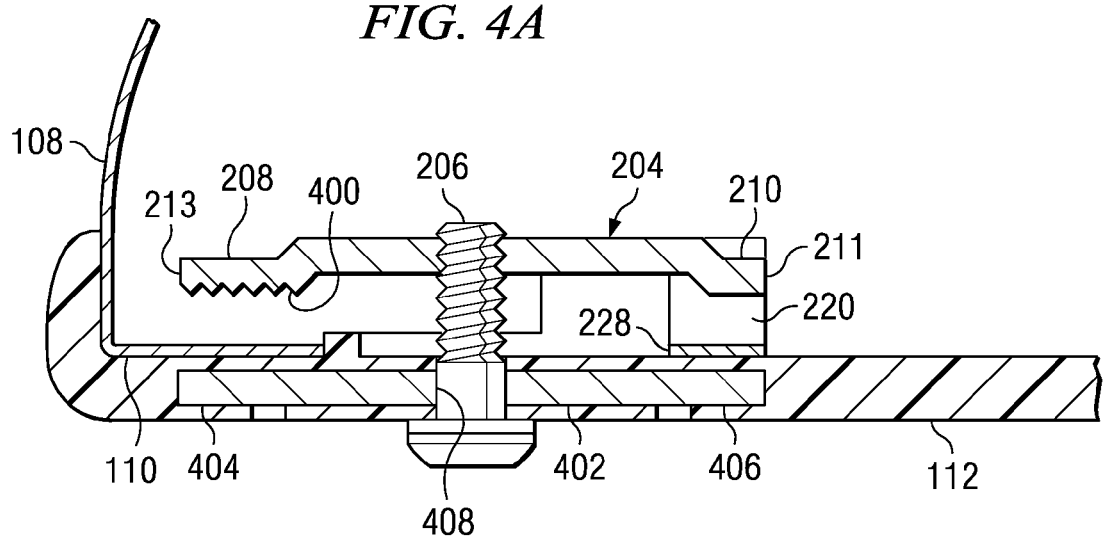
FIG. 4A is a sectional view taken through the mud flap and fender fold in a plane which includes a fastener bolt hole, showing the rotating member in the second position and prior to tightening.
Figure 4B:
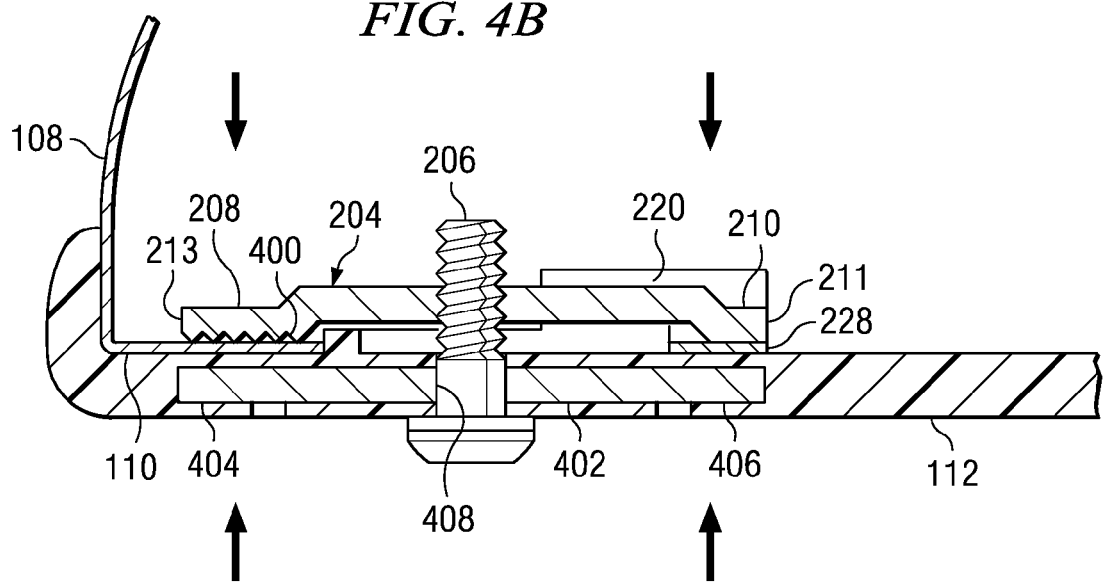
FIG. 4B is a sectional view similar to that of FIG. 4A, after the rotating member has been threadably pulled in on the fastener bolt to a third position, clamping the mud flap to the fender fold.

FIGS. 4A and 4B are sectional views taken from above through the bolt axis, wherein the rotating clamping member 204 is in the angular position seen in FIG. 3. In FIG. 4A, the rotating clamping member 204 is still residing on the free end of threaded bolt 206. Its stop arm 210 has come into contact with stop surface 220, such that further rotation of member 204 and bolt 206 as a unit will be prevented. At this point, further rotation of the bolt 206 will cause the rotating clamping member 204 to advance forwardly (in this view, downwardly) down the threads of bolt 206, until the position shown in FIG. 4B is reached. In this later position, teeth or ridges 400 formed on a forward side of the stop end 213 begin to grip the rearward (here, upward) surface of the fender fold 110, while offset end 211 begins to be supported by shelf 228.

It is further preferred to provide a stationary clamping member 402 against which the rotating clamping member 204 may exert clamping force. In the illustrated embodiment, the stationary clamping member 402 is provided as an in-molded reinforcement to the otherwise rubber or other polymeric mud flap 112. In other, nonillustrated embodiments, the stationary clamping member 402 is omitted and the clamping action takes place between the mud flap body and the rotating clamping member 204. In the illustrated embodiment, the stationary clamping member 402 is preferably about as thick as the rotating clamping member 204 (such as 0.125 in.), and is preferably made of a tough and durable material such as stainless steel. The stationary clamping member should be at least coextensive in length with the clamping member 204, such that a first end 404 will be opposite the clamping end 213 of the rotating clamping member 204 when the latter has been rotated to the second position, and a second end 406 of the stationary member 402 will be opposite the stop end 211 in this position. Conveniently, the stationary member 402 and the rotating clamping member 204 can be fashioned from the same blank stamped out of sheet steel; in the instance of the rotating clamping member 204, the blank's central hole would be tapped, the ends 211, 213 offset, and the finger 302 cut and bent; in the instance of stationary member 402, a larger central hole 408 would be drilled to nonthreadedly receive the bolt 206 and a strip including 302 would be cut and removed.

As shown in FIG. 4B, after fully tightening the bolt 206, the stop end 211 abuts the rearward (here, upward) surface of the shelf 228. When this happens, the contact between the stop end 211 and the shelf 228 will act as a fulcrum, concentrating more clamping force between clamping end 213 and the end 404 of the stationary clamping member 402. To maximize this leverage, it is preferred that the clamping arm 208 and the stop arm 210 be angularly spaced apart by about 180 degrees.

FIGS. 4A and 4B also demonstrate the advantage of offsetting the ends 213 and 211 in a forward direction. As so offset, the end 213 will contact the fender fold 110 first, concentrating clamping force within a limited footprint. The end 211 will contact surface 222 prior to the un-offset rest of the clamping member 204 bottoming out on the mud flap 112, thereby locating the fulcrum at a maximum distance away from the fender fold 110 and maximizing clamping leverage exerted by bolt 206.

Figure 5A:
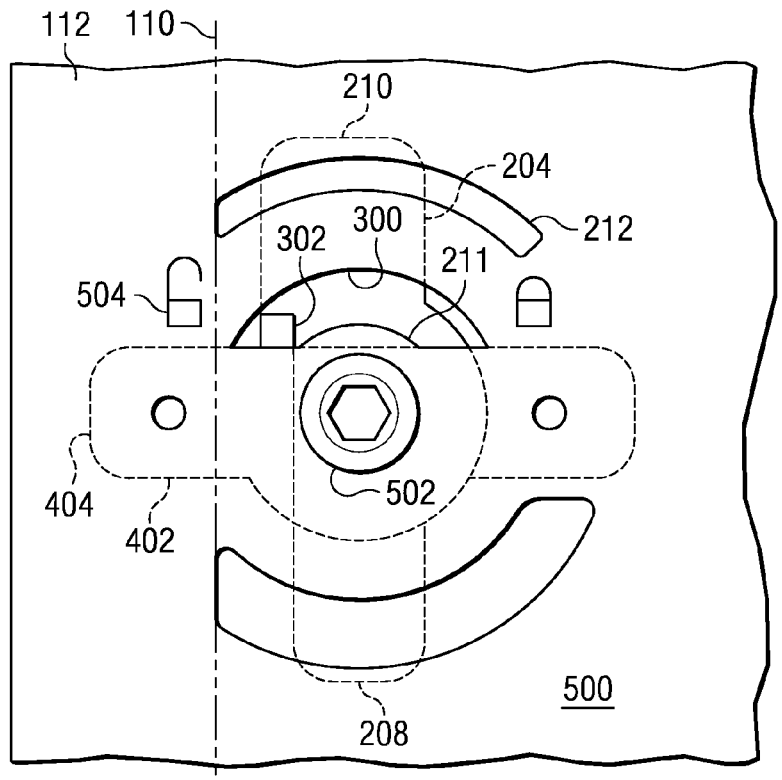
FIG. 5A is a detail of the mud flap from a forward position looking rearward, showing a visual indicator according to the invention when the rotating member is in the disengaged position.
Figure 5B:
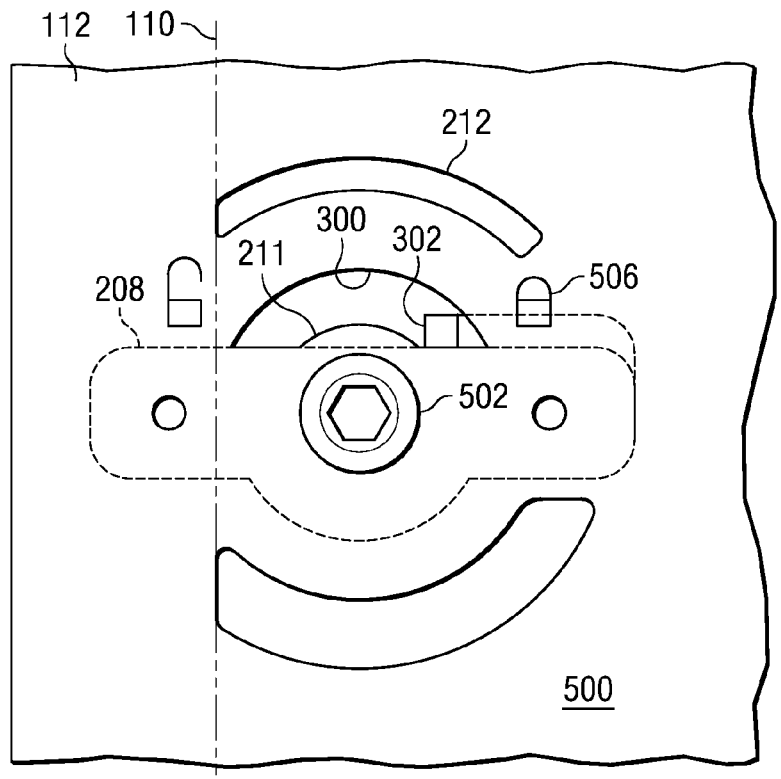
FIG. 5B is a detail similar to that shown in FIG. 5A, showing the visual indicator after the rotating member is rotated to a second position.

FIGS. 5A and 5B are views from the front face 500 of the mud flap 112, which is the face that faces the wheel well and which is accessible by the consumer. A head 502 of the bolt 206 in the illustrated embodiment takes an Allen key, but other sorts of receptacles for torque-imparting drivers can be used instead, such as a slot, a Philips head or a Torx receptacle.

In FIG. 5A, the rotating member 204, shown in dotted line, is in a first, disengaged position, which is the position that it is in as received by the consumer. Prior to installation the rotating member 204 may be kept in this position by a wavy washer (not shown) on the shaft of bolt 206 immediately behind bolt head 502, which would press the stop arm 211 against rest 212 (a corresponding indentation of which is seen from the front side in this embodiment). Alternatively a light adhesive could be applied to the forward surface of stop end 211 to temporarily adhere it to the rear surface of rest 212. It can be seen that no portion of the rotating clamping member 204 is behind the fender fold 110, represented here by a vertical dashed line. In this first position, the clamping member finger 302 is on the left end of the arcuate slot 300, next to an indicium 504 that indicates that the fastener is in an "unlocked" or unfastened position.

The finger 302 also acts as an auxiliary stop to the rotation of the rotating clamping member 204 relative to the rest of the mud flap 112. This is because that, in a preferred embodiment, the finger 302 projects forwardly enough that its arc of rotation is intersected by the end of the mud flap slot, and more preferably by an edge of an in-molded steel stationary clamping member 402, shown in this FIGURE in phantom. In an alternative embodiment, the integrally molded stop 216 (FIGS. 2 and 3) can be dispensed with and reliance placed on the interaction of the finger 302 with the stationary clamping member 402 instead.

Stationary clamping member 402 is in this embodiment substantially laterally coextensive with the rotating clamping member 204. It can be seen that end 404 of the stationary clamping member 402 is located in front of the fender fold 110.

In FIG. 5B, the consumer has turned the bolt head 502 in a clockwise direction. The clamping arm 208 of the rotating member 204 swings behind the fender fold 110, capturing the fender fold 110 in between two preferably steel clamping members 204 and 402. The indicating finger 302 has swung over to a rightmost position inside of arcuate slot 212 to be adjacent to an indicium 506 that indicates that the fastener is in a "locked" position. This gives the consumer the very important piece of information that the clamping arm 208 has been successfully rotated to a point in back of the fender fold 110. Once the rotating member is rotated to the position shown in FIG. 5B, further clockwise rotation of the bolt head 502 will cause the clamping member 204 to advance forwardly on the threads of the bolt 206, in a direction toward the reader in FIG. 5B. Since members 204 and 402 are preferably fairly thick (such as 0.125 in.) steel shapes that are held together by a rugged bolt 206, a large amount of clamping force can be exerted between members 204 and 402, securely capturing the fender fold 110 between them. A very secure fastening result is critical to consumer acceptance of the product as well as to product safety.

Figure 6A:
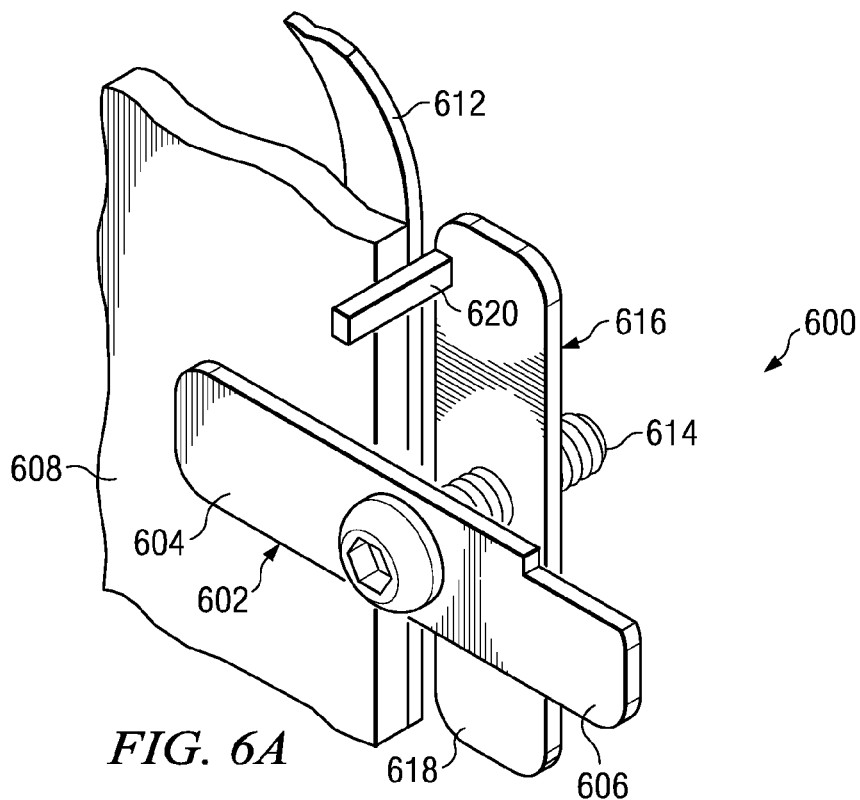
FIG. 6A is an isometric view of a fastener according to the invention which is not incorporated into the object to be affixed, with a rotating clamping member thereof shown in a first, unengaged position.
Figure 6B:
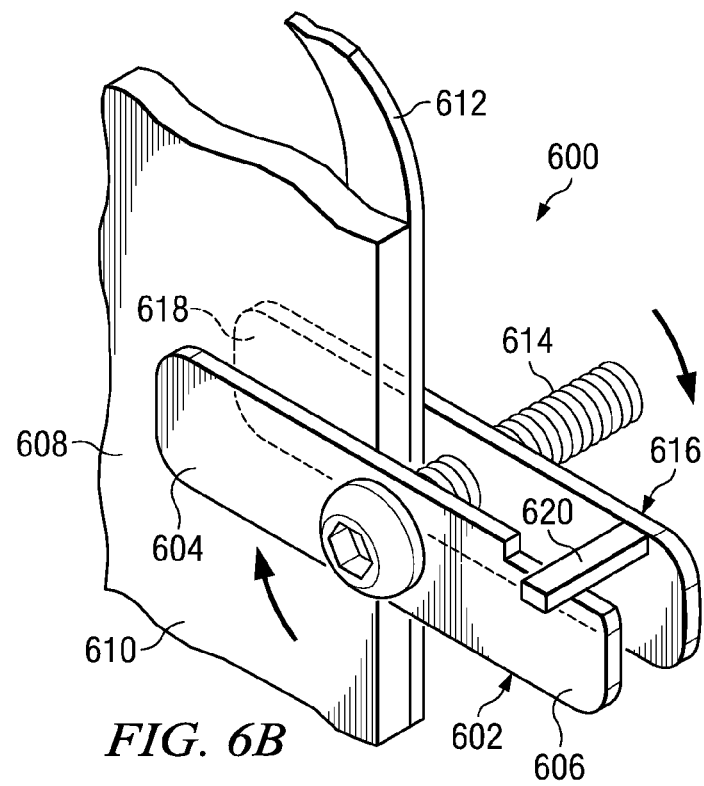
FIG. 6B is an isometric view of the fastener shown in FIG. 6A, showing a rotatint clamping member thereof in a second position.

While the present invention has been described above in conjunction with an embodiment in which the stationary clamping member 402 has been in-molded into the object to be clamped to the vehicle, the present invention has application to other situations in which a fastener according to the invention is provided separately from the object to be affixed. Such a fastener is shown in FIGS. 6A and 6B. In this separate-fastener embodiment, a fastener indicated generally at 600 has a stationary member 602 with at least a first arm 604 and possibly a second arm 606, as shown, which however don't have to be molded into the object 608 to be affixed. The stationary member 602 should be positioned on e.g. a front side 610 of the object 608 to be clamped. The object 608 in turn is positioned on top of a fender fold, tab, projection or other purchase point 612 on the vehicle. The bolt or screw 614 is positioned to run along side this tab or projection 612, and may run through a hole or slot (not shown) in the object 608 to be affixed. Threaded to the bolt 614 is the rotating member 616, which can be rotated as a unit such that a clamping arm 618 thereof swings behind the fender fold, tab or projection 612 on the vehicle. Some rotational stop (such as one projecting from the stationary member 602, or, as illustrated, a stop made from the intersection of the arc of a finger 620 extending at right angles from the rotating member 616 and an edge of the stationary member 602) must be provided in order to stop the rotation of the rotating clamping member 616 after its clamping arm 618 has swung behind the purchase point 612, the clamping member 616 thereafter being drawn toward the stationary member 602 until the object 610 is clamped to the vehicular fender fold, tab or projection 612.

In another alternative embodiment (not shown), the object to be affixed can be provided with a slot into which the stationary member 602 is inserted. The bolt 614 could be inserted through a cooperating bolt hole that opened up on both sides of the slot, or the object could have a further slot meant to receive the bolt shaft.

The illustrated embodiments show the structure and operation of one fastener according to the invention. More than one of these can be used to affix a single object to a vehicle. For example, the fastener 114 could be used at several places along an arc to affix a wheel well cover in place over a vehicle wheel well. In use a fastener 114 can be disposed vertically, horizontally or at some disposition in between, as might occur where an object is being affixed to various locations along a long arc of a fender fold 110.

In summary, a clamping fastener has been shown and illustrated which obviates the need for drilling new holes in fender folds or other vehicle purchase points. Instead, a rotating clamping member is rotated on a bolt or screw until a clamping arm is positioned behind the fender fold or other purchase point. At this point the rotating clamping member hits a stop that prevents it from rotating with the screw as a unit. Further rotation of the bolt or screw causes the rotating clamping member to be drawn toward a stationary clamping member of the fastener, securely clamping the fender fold or other vehicular purchase point between the two clamping members. In a preferred embodiment the stationary member of the fastener is in-molded within a polymer body of the object to be attached, such as a mud flap. A visual indicator has been provided such that the consumer can easily tell whether the rotating clamping member has swung to a position behind the fender fold or purchase point, so that the consumer may be assured that the fastener is actually clamping on to the fender fold or the like instead of just to the mud flap or other object to be affixed.

While certain embodiments of the present invention have been described above and illustrated in the appended drawings, the present invention is not limited thereto but only by the scope and spirit of the appended claims.

We claim:

1. A mud flap for attachment to a fender fold of a vehicle wheel well, comprising:
   a mud flap body having a front face and a rear face;
   a screw-threaded attachment bolt received into a through-hole formed in the mud flap body from the front face to the rear face thereof, the bolt disposed on an axis;
   a rotating clamping member having a center hole which is threadably carried on the attachment bolt, the rotating clamping member disposed rearwardly from the rear face of the mud flap body, a clamping arm of the rotating clamping member extending radially outwardly from the bolt axis and terminating in a clamping end, a stop arm of the rotating clamping member extending radially outwardly from said axis to be angularly displaced from the clamping arm, the stop arm terminating in a stop end, the rotating clamping member rotatable around the axis from a disengaged position to a second position;
   a stop formed to extend rearwardly from the rear side of the mud flap body, a height of the stop measured in an axial direction preselected to intersect an arc of travel of the stop end of the rotating clamping arm such that the stop end of the clamping arm will abut the stop when the rotating clamping member reaches the second position; and
   an edge of the mud flap body placed forwardly of the fender fold, the rotating clamping member and the attachment bolt rotatable as a unit from the disengaged position to the second position such that the clamping end of the rotating member becomes positioned to the rear of the fender fold, and such that the stop end of the rotating member abuts said stop, further rotation of the attachment bolt causing the rotating clamping member to be drawn axially forwardly toward the rear side of the mud flap body and causing the clamping of the fender fold between the clamping end of the rotating clamping member and the edge of the mud flap body.

2. The mud flap of claim 1, wherein the mud flap has further attachment means selected from the group consisting of (a) further pairs of attachment bolts and rotating clamping members spaced along the edge of the mud flap body, and (b) mounting screw holes for alignment with preexisting vehicle manufacturer-drilled holes in the fender fold.

3. The mud flap of claim 1, wherein the mud flap body is formed of a polymer, a rigid stationary clamping member in-molded into the mud flap body to radially extend from the axis to a position opposite the clamping end of the rotating clamping member when the rotating clamping member is in the second position, such that the fender fold may be clamped between the rotating clamping member and the stationary clamping member when the rotating clamping member is drawn frontwardly from the second position along the attachment bolt.

4. The mud flap of claim 3, wherein the stationary clamping member is fabricated of steel.

5. The mud flap of claim 1, wherein the stop arm of the rotating clamping member is positioned about 180 degrees from the clamping arm of the rotating clamping member.

6. The mud flap of claim 1, wherein the stop is integrally molded with the mud flap body.

7. The mud flap of claim 1, and further including a rest which projects rearwardly from a general rear face of the mud flap body, the stop arm of the rotating clamping member resting on the rest when the rotating clamping member is in the disengaged position.

8. The mud flap of claim 1, wherein a central portion of the rotating member is disposed around the center hole and between the clamping arm and the stop arm, a width of the central portion being enlarged relative to a width of the clamping arm and a width of the stop arm.

9. A mud flap for attachment to a vehicle wheel well, comprising:

a mud flap body having a front face accessible to a consumer and an opposed rear face for attachment to a surface of a vehicle wheel well;

a fastener coupled to the mud flap for affixing the mud flap to the vehicle wheel well; and a visual indicator visible from the front face of the mud flap, the visual indicator movable from a first position and indicating that the fastener is not attaching the mud flap to the vehicle wheel well, to a second position indicating that the fastener is attaching the mud flap to the wheel well;

wherein the visual indicator includes an arcuate slot having first and second ends, a finger of the fastener disposed in the slot and movable between the first and second ends thereof to indicate a change in fastener position.

10. The mud flap of claim 9, wherein the finger is formed as a unit with a rotating clamping member of the fastener, a clamping arm of the rotating clamping member movable from a first position in which it is not engaged with the vehicle wheel well, to a second position in which the clamping arm is disposed behind a fender fold of the vehicle wheel well.

* * * * *